(12) United States Patent
Malsch et al.

(10) Patent No.: US 6,824,212 B2
(45) Date of Patent: Nov. 30, 2004

(54) VEHICLE SEAT

(75) Inventors: Heiko Malsch, Heiningen (DE); Harald Fischer, Unterensingen (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/938,416

(22) Filed: Aug. 23, 2001

(65) Prior Publication Data

US 2002/0074843 A1 Jun. 20, 2002

(30) Foreign Application Priority Data

Aug. 24, 2000 (DE) .......................................... 100 41 529
Aug. 24, 2000 (DE) .......................................... 100 41 533
Aug. 24, 2000 (DE) .......................................... 100 41 528

(51) Int. Cl.⁷ .............................................. B60N 2/42
(52) U.S. Cl. .............. 297/216.12; 297/408; 297/216.13
(58) Field of Search ............................ 297/216.12, 408, 297/216.13

(56) References Cited

U.S. PATENT DOCUMENTS

| | | | |
|---|---|---|---|
| 4,778,218 A | | 10/1988 | Suman |
| 5,823,619 A | * | 10/1998 | Heilig et al. ............ 297/216.12 |
| 5,842,738 A | * | 12/1998 | Knoll et al. ......... 297/216.12 X |
| 5,884,968 A | * | 3/1999 | Massara ................. 297/216.12 |
| 6,079,776 A | * | 6/2000 | Breitner et al. ...... 297/216.12 X |
| 6,082,817 A | * | 7/2000 | Muller .............. 297/216.12 X |

* cited by examiner

Primary Examiner—Anthony D. Barfield
(74) Attorney, Agent, or Firm—Bill C. Panagos

(57) ABSTRACT

Vehicle seat (1), in particular for a passenger car, having a backrest (3) and a head restraint (7) which is arranged at the upper end of the said backrest and has a head restraint rear part (9) mounted essentially rigidly in the backrest, and a head restraint front part (13) which can be pivoted about an essentially horizontal rotational axis (15), in particular at the upper end of the head restraint rear part, having at least one driving device (17, 19, 21) for pivoting the head restraint front part forwards about the rotational axis by a large angular amount in response to a first control signal indicating a vehicle impact, and by settable angular amounts in response to a second control signal indicating a desired inclination of the head restraint, for adjusting the inclination.

18 Claims, 3 Drawing Sheets

VEHICLE SEAT

BACKGROUND OF THE INVENTION

1. Field of the Invention

This invention relates to a vehicle seat including a clamshell-shaped head restraint with a front part which is movable relative to a rear part in response to a control signal.

2. Background Art

Serious attention has been given for decades to increasing the passive safety in the design of motor vehicles, in particular passenger cars. In addition to endeavors to use CAD techniques for optimizing the entire vehicle structure so as to improve the crash behavior, emphasis has been given to measures for increasing the safety of the occupants in the interior. One result of this development involves complicated and extremely effective restraint systems using various air bags and seat belt tighteners.

A further result, although one which has aroused less public attention, of the endeavors for a design of the interior which is optimized with regard to occupant safety involves solutions for optimizing the position of parts of the seat structure, in particular of the head restraint part, in a frontal or rear-end impact. One solution of this type which has been introduced in practice is the "pro-tech" system from EP 0 627 340 A1.

In the conventional system, in a rear-end impact the head restraint part is pivoted towards the driver's head so as to counteract the dreaded "whiplash". The head restraint adjustment is brought about via a complicated and costly lever mechanism and via a compression plate in the backrest, which compression plate is acted upon by the driver's body.

In this case, head restraints, at least of the front seats, have been designed such that they are height-adjustable, in order to provide vehicle occupants of different height an optimally positioned bearing surface in each case for the back of the head in the event of a frontal impact. At the same time, the height-adjustability also constitutes an element of comfort, since even during normal driving many drivers prefer a posture with the back of their head leaning against the head restraint. Recently, head restraints which are even height-adjustable electrically are being offered in high-cost passenger cars.

In the last few years, head restraints having an adjustable inclination have also become established—at least as an option—in passenger cars of the upper class and upper middle class. These head restraints provide further improvement in the ability to set the head restraint to match the anatomy and preferred posture of the vehicle occupant. In the known arrangements, the inclination is adjusted manually.

All in all, vehicle seats having height-and inclination-adjustable head restraints—in particular those with electric height adjustment—have a complicated structure and are therefore expensive even before they are able to satisfy all of the safety requirements and demands for comfort. In particular, an adjustment of the inclination while under way is possible only with difficulty, if at all.

SUMMARY OF THE INVENTION

The invention is therefore based on the object of specifying a vehicle seat which is improved in respect of the functioning and design of the head restraint and is distinguished by a simple construction with reliable functioning and simple operability.

This object is achieved by a vehicle seat including a clamshell-shaped head restraint with a front part which is movable relative to a rear part in response to a control signal.

The invention includes the basic concept of providing a two-part head restraint which as such is known and has a pivotable front part with a suitable driving device for pivoting it forwards in the event of a vehicle impact, and of equipping a vehicle seat with this combined arrangement. Furthermore, the invention includes the concept of realizing a non-manual adjustment of the inclination in an expedient manner on the basis of the two-part head restraint construction. A head restraint of this type is suitable for equipping with a motor-powered or hydraulic driving device, particularly since the rigid head restraint rear part conveniently provides a supporting surface not only for the actual adjustment, but also when the head restraint front part (and therefore the driver) is subjected to great momentum as a consequence of a vehicle impact.

In a design which can be realized in a structurally particularly useful manner, a mechanical actuator or control signal transmitter is provided which detects the acceleration imparted in the vehicle impact to a vehicle occupant and derives from this the control signal and at the same time the driving force for driving the head restraint front part. In the very simplest case, this mechanical transmitter has a compression plate which is arranged in the backrest and can be moved with respect to an essentially rigid backrest frame in the direction of travel by a movement component.

However, a design which is preferred from the current point of view includes the recognition that the vehicle occupant's body which is usable as the "driving source" and in the event of an impact experiences an acceleration and exerts a force on the vehicle seat, in particular on the backrest, does indeed act upon the backrest with a great force, but can only cover a relatively small distance therein. This is due to the fact that the space utilization in modern motor vehicles is optimized even by doing without backrest construction depths which are not absolutely required. In this case, most of the construction depth or thickness of a backrest has to be available for movements of the vehicle occupant in the upholstery with little contact-pressure force, i.e. so as to ensure an appropriate seat comfort.

This recognition results in the further concept of providing a driving or force-transmitting device for adjustment in the event of a crash, which device obtains an enlarged adjustment path from the displacement of the vehicle occupant over a short distance (under the effect of the load of the ultimately available driving force). Ultimately, the preferred design includes the concept of realizing this basic idea by co-ordinating primary and secondary tension elements which are driven by the displacement of a movable body (specifically, the vehicle occupant's body), in which case the abovementioned extension of the adjustment path is obtained by the primary tension elements causing a zigzag or meandering deformation of the secondary tension element.

In one specific refinement, the primary tension elements are designed as essentially inextensible wires or threads or strips running transversely or obliquely with respect to the direction of displacement of the vehicle occupant and with respect to the longitudinal axis of the secondary tension element. In particular, the essentially perpendicular arrangement with respect to one another of the direction of displacement of the vehicle occupant's body, of the longitudinal axis of the secondary tension element and of the longitudinal extensions of the primary tension elements ensures an optimum force/path conversion and therefore advantageous functions of the driving device.

In a first refinement of this design, which, in principle, is preferred, the wires or strips which are used as the primary tension elements loop around the secondary tension element and are fastened by both ends to the basic bodyspecifically, to the vehicle seat frame. In this case, the two ends are fastened to points on the basic body which are either closely adjacent to one another or else at a greater distance from one another.

In an alternative refinement to this, the wires or strips are fastened by one end in each case to the basic body and have at the free end a hook or a loop with which they grip around the secondary tension element.

In both designs, a certain amount of play can be provided between the respective engagement points of the primary tension elements and the secondary tension element so as to ensure unimpeded movement of the vehicle occupant in the seat upholstery. In another variant, a corresponding amount of play is, however, also provided with regard to the adjustment action of the secondary tension element itself, and the primary tension elements loop or grip around the secondary tension element in a manner essentially free from play.

In another design in which the primary tension elements are realized as wires or strips, the latter are connected at their first end fixedly to the basic body and at their second end fixedly to the secondary tension element, in which case they are, in particular, welded, (hard) soldered or pressed to the latter. Preferably the secondary tension element is also designed as an essentially inextensible wire or thread or inextensible strip, in which case the secondary tension element has to be provided with a marked flexibility so as to sufficiently easily form the zigzag or meandering configuration in the event of being released. Also advantageous is a sheath/core configuration in the manner of a Bowden cable which, when the components are suitably co-ordinated, can operate in a manner which is particularly low in friction.

In designs which can be realized in a particularly simple and cost-effective manner, the primary tension elements and/or the secondary tension element are designed as metal wires, in particular steel wires, metal strips (especially steel strips) or threads or strips made of plastic reinforced with high-grade fibres which are strong in tension (Kevlar or the like).

In an alternative design, instead of being realized by a multiplicity of individual wires, threads or strips, the primary tension elements are realized by at least two surface-type tension elements, one of which in each case is arranged on each side of the secondary tension element and is fastened to the corresponding side of the basic body (especially the vehicle seat frame). These surface-type tension elements are then fastened to the secondary tension element in each case at a multiplicity of points or grip around the said secondary tension element with suitable hook-or loop-shaped extensions or the like at a multiplicity of points.

The engagement points on the secondary tension element are-as in the design having a multiplicity of individual, essentially linear tension elementsarranged in such a manner that the primary surface-type tension elements on both sides of the secondary tension element act in an alternating manner thereon in the longitudinal direction thereof in order to realize the desired zigzag or meandering deformation when released.

In a design which can be produced easily, is light and in a particularly advantageous manner can be integrated into a vehicle backrest, the abovementioned surface-type tension elements are designed as essentially inextensible lattices, braided or woven structures, in particular made of metal-or fibre-reinforced plastic wires or threads or strips.

In all of the above-mentioned designs, the primary tension elements are expediently fastened to the mutually opposite side cheeks of the vehicle seat. In their design as wires, threads or strips, the primary tension elements therefore preferably run essentially horizontally, i.e. parallel to the vehicle floor. In this connection, the secondary tension element is preferably fastened to a transverse support in a lower or upper end region of the backrest or to a transverse support of the seat part of the vehicle seat and therefore runs at an angle of approximately 90° or less with respect to the vehicle floor, which angle approximately corresponds to the inclination of the backrest.

In addition or as an alternative thereto, provision is expediently made for the primary tension elements and the secondary tension element to be arranged behind the backrest upholstery of the vehicle seat.

As an alternative to the abovementioned, mechanical control signal transmitter or actuator, in order to control the driving device for the head restraint front part, use can be made of an electronic control signal transmitter which detects a rapid approach of another vehicle or else an approach of the vehicle occupant onto the backrest of his own vehicle.

This control signal transmitter is equipped with evaluating or processing devices for evaluating the approach signal under predetermined path/time criteria and, when these criteria are satisfied, emits a control signal which indicates a vehicle impact which is imminent or else has already taken place (in the event of the evaluation of the approach of the vehicle occupant onto the backrest). The sensor is, in particular, a proximity sensor based on ultrasound or radar, as is known per se by the expert.

In a simple and reliably effective design, the driving device for adjustment in the event of a crash has an energy accumulator which is connected to the head restraint front part, in particular a compression-spring device which is supported against the backrest or the head restraint rear part and is prestressed with respect to the head restraint front part. This energy accumulator can be controlled and released by the abovementioned control signal. When designed as a compression-spring device, it is assigned, in particular, an unlocking element which is actuated via the control signal and releases the compression spring for pivoting the head restraint front part forwards.

Furthermore, the driving device, especially the above mentioned energy accumulator, is expediently assigned an arresting device and/or a damping device which prevents the receding of the head restraint front part under the pressure of the vehicle occupant's head impacting against it directly after the pivoting forwards, or makes it substantially more difficult. This ensures that the vehicle occupant's head can be reliably intercepted and the dreaded whiplash due to the cervical vertebra being overextended can be prevented.

In this connection, it is physiologically advantageous to use a damping device which does not completely prevent the receding of the head restraint front part, but substantially damps or retards it, and which therefore reduces the momentum of the impact of the back of the head against the head restraint. This damping device preferably has a hydraulic or frictional damping element-which is known as such.

In a preferred design, an active actuating element-in particular a Bowden cable device as a tension element-connected to an electric motor is fitted to the head restraint front part, for the purpose of adjusting the inclination. In addition, provided between the head restraint front part and the head restraint rear part is a passive compression-spring element which is supported against the latter and prestresses the head restraint front part forwards (i.e. towards the back of the vehicle occupant's head).

These components advantageously interact in such a manner that a precisely predeterminable tightening of the tension element (for example, by winding the Bowden cable wire onto a reel or pulley connected rigidly to the shaft of the electric motor) pivots the head restraint front part about the rotational axis by an exactly metered angular amount, in which case the said head restraint front part is then held in this angular position by the force of the compression-spring element. In a simple and cost-effective design, the compression-spring element has at least one steel helical spring; alternative realizations are spiral springs, elastomer blocks or the like.

An alternative realization to the abovementioned design of the adjustment of the inclination comprises an active compression element which is assigned to the head restraint front part and with which the head restraint front part is brought into a desired angular position relative to the rear part and is locked in this position. A self-locking drive is particularly suitable here; alternatively, a separate arresting device may also be assigned to a drive without its own self-locking action.

Preferred designs of the active compression element include a rack-and-pinion device, in which the pinion sits, in particular, on the shaft of the electric motor used as the driving source, or the piston rod or a similar, movable element of a piston/cylinder device. The latter is expediently indirectly driven by an electric motor via a hydraulic pump and can be arranged entirely or at least partially between the head restraint rear part and the head restraint front part.

However, in view of the general trend of using separate servomotors for a very wide range of adjusting functions in the automotive industry, this last-mentioned variant is reserved more for special applications.

The driving device for the adjustment of the inclination is assigned either a simple actuating switch or-preferably-an electronic control unit which in particular has an inclination-angle memory for storing a plurality of predetermined angular positions of the head restraint front part. In this design, different drivers can call up their optimum, pre-stored angular position at the push of a button.

In a preferred design, a motor-powered or hydraulic adjustment of the height of the head restraint is provided in addition to the adjustment of the inclination. Generally, a separate drive is present for the adjustment of the height.

The driving device for the adjustment of the inclination can be height-adjustable together with the head restraint or alternatively can be arranged in a positionally fixed manner on the backrest frame. The former variant is appropriate in particular when the driving device is designed with a rack-and-pinion arrangement, while the latter design is expedient in conjunction with a Bowden cable device.

When the vehicle seat is designed with a combined adjustment of the height and inclination, a combined electronic control unit for both adjustment processes is preferably provided. The said control unit has, in particular, a vertical-position memory for storing a predetermined number of height settings, which memory is designed so that it is connected to the inclination-angle memory for the adjustment of the inclination, or at least so that it interacts with the latter in such a manner that a plurality of angular positions and height positions can be stored together in the control unit and can be called up in a combined manner at the push of a button.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figures 1, 1A:
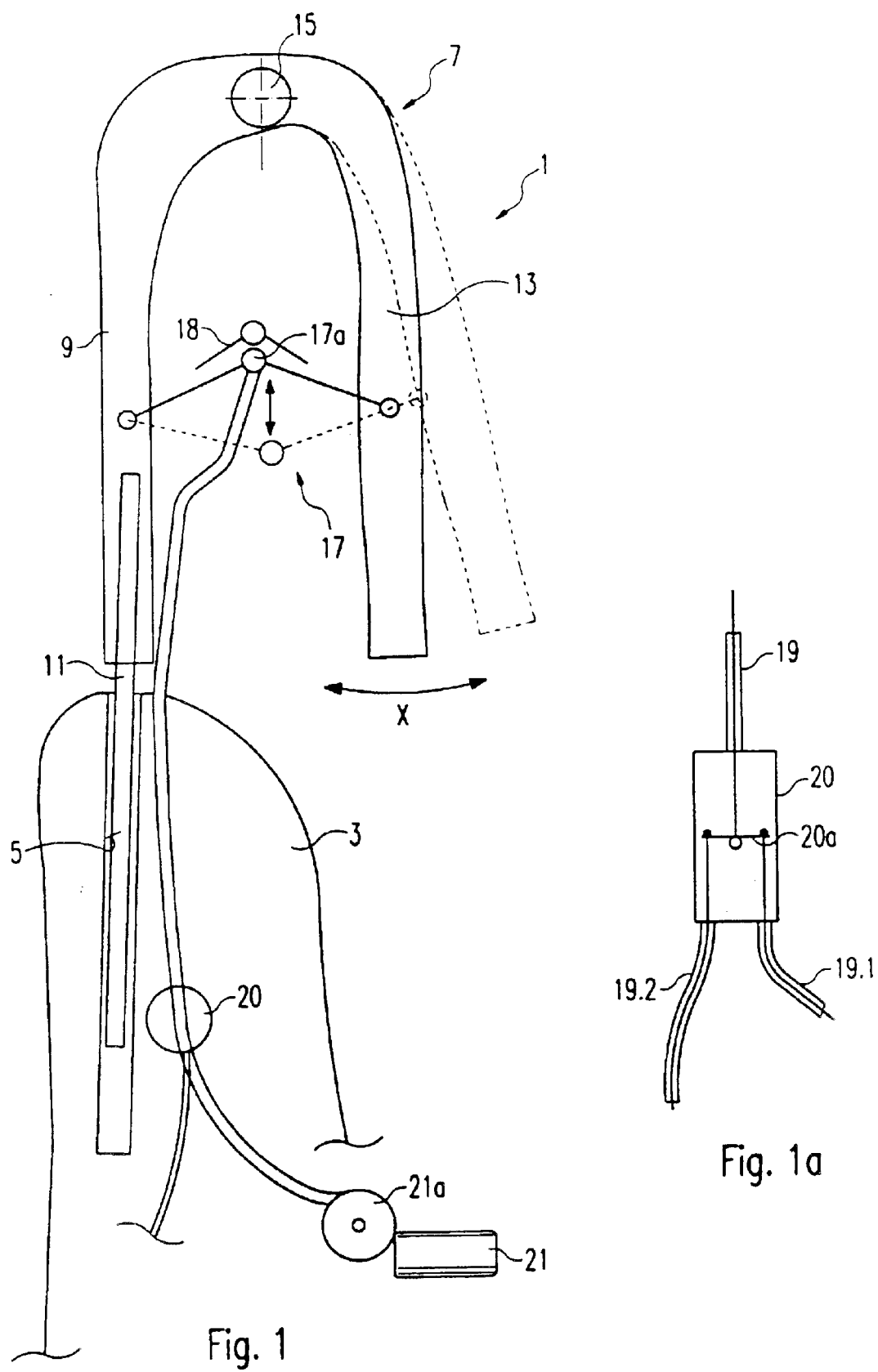
FIGS. 1 and 1a show a sketch for explaining the basic construction and a variant of the force transmission for adjustment in the event of a crash and adjustment of the inclination of the head restraint in a vehicle seat according to the invention.

In FIG. 1, the essential components for understanding an embodiment of the invention are shown in a roughly schematic manner in a type of cross-sectional illustration of the upper section of the backrest of a passenger-car seat 1. The passenger-car seat 1 comprises the backrest 3 having approximately vertically aligned head restraint guides 5 for supporting a head restraint 7. The latter essentially comprises a head restraint rear part 9, which is connected fixedly to head restraint rods 11 for the vertically displaceable mounting in the head restraint guides 5 of the backrest 3, and a head restraint front part 13 which is movable with respect to the head restraint rear part 9.

The head restraint front part 13 can be pivoted about a horizontal rotational axis 15 at the upper, forwardly bent end of the head restraint rear part 9, whereupon its lower end can be effectively moved in the direction of the arrow x towards the back of a vehicle occupant's head (not illustrated) or away from the latter. In the figure, a first rotational position of the head restraint front part 13 is illustrated by solid lines and a second rotational position by dashed lines.

A spreading-lever arrangement 17 which fixes the front part with respect to the rear part is provided between the head restraint rear part 9 and the head restraint front part 13. The said spreading-lever arrangement is assigned a spring element 18 which prestresses the spreading levers, and therefore the head restraint front part 13, with respect to the rear part 9. A Bowden cable 19 is fastened by the one end to a linkage point 17a of the spreading-lever arrangement 17.

In an alternative embodiment, the spring element 18 may be replaced by a compression spring which acts in cooperation with a motor-powered or hydraulically-actuated Bowden cable which selectively pulls the front part 13 toward the rear part 9 against the force of the compression spring, or releases the front part 13 so that it may be moved away from the rear part 9 by the compression spring.

In a further embodiment, a damper element may be provided obliquely extending between the rear part 9 and the front part 13 to damp and retard reversing of the head restraint front part 13 when the back of the occupant's head impacts against it. The damper element may be frictional, hydraulic or pneumatic.

In a coupling element 20, which is illustrated more precisely in FIG. 1a, the Bowden cable 19 branches into a first and second Bowden cable branch 19.1 and 19.2. As can be seen in FIG. 1a, the coupling element 20 essentially comprises a wire connector 20a which connects the ends of the inner wires of the single-piece Bowden cable section 19 and of the two branches 19.1 and 19.2 fixedly to one another in such a manner that—in the manner of an OR element—a tensile force acting on one of the branches 19.1, 19.2 is passed on into the single-piece section 19.

A first end of the Bowden cable (put more precisely: of an inner wire) is wound around a reel 21a which is seated on the shaft of an electric motor 21 for adjustment of the inclination. The electric motor is activated—which is not illustrated in the figure—by an actuating switch or via an electronic control unit. The second end of the Bowden cable is connected (which is not illustrated, however, in FIG. 1) to a drive for release in the event of a crash, which drive is described more precisely further below with reference to examples.

When the electric motor is activated via a corresponding control signal ("head restraint forwards" or "head restraint rearwards"), the reel 21a is rotated in one of the two rotational directions and the inner wire of the Bowden cable 19 is tightened or relaxed, whereupon the head restraint front part 13 is moved forwards or backwards with respect to the head restraint rear part 9 as symbolized by the arrow via the spreading-lever arrangement 17 in interaction with the spring element 18. In a manner which is similar in principle, the driving force applied during a release in the event of a crash is transmitted to the head restraint front part, but in this case the transmission of force takes place very rapidly, and the spreading-lever arrangement is stretched until it reaches the position beyond the dead center, which is illustrated by dashed lines in FIG. 1.

In this position, the lever arrangement acts in a self-locking manner, i.e. when the back of the vehicle occupant's head impacts against it is unable to recede into its originally set position, and, as a result, securely intercepts the head. After the accident, it has to be unlocked manually in a suitable manner (known per se) and can then be returned into the set position of inclination.

Attention has to be given to the fact that the spring element 18 has to have such a spring constant that the set angular position of the head restraint front part is retained even when the back of the vehicle occupant's head is laid violently against it.

Figure 2:
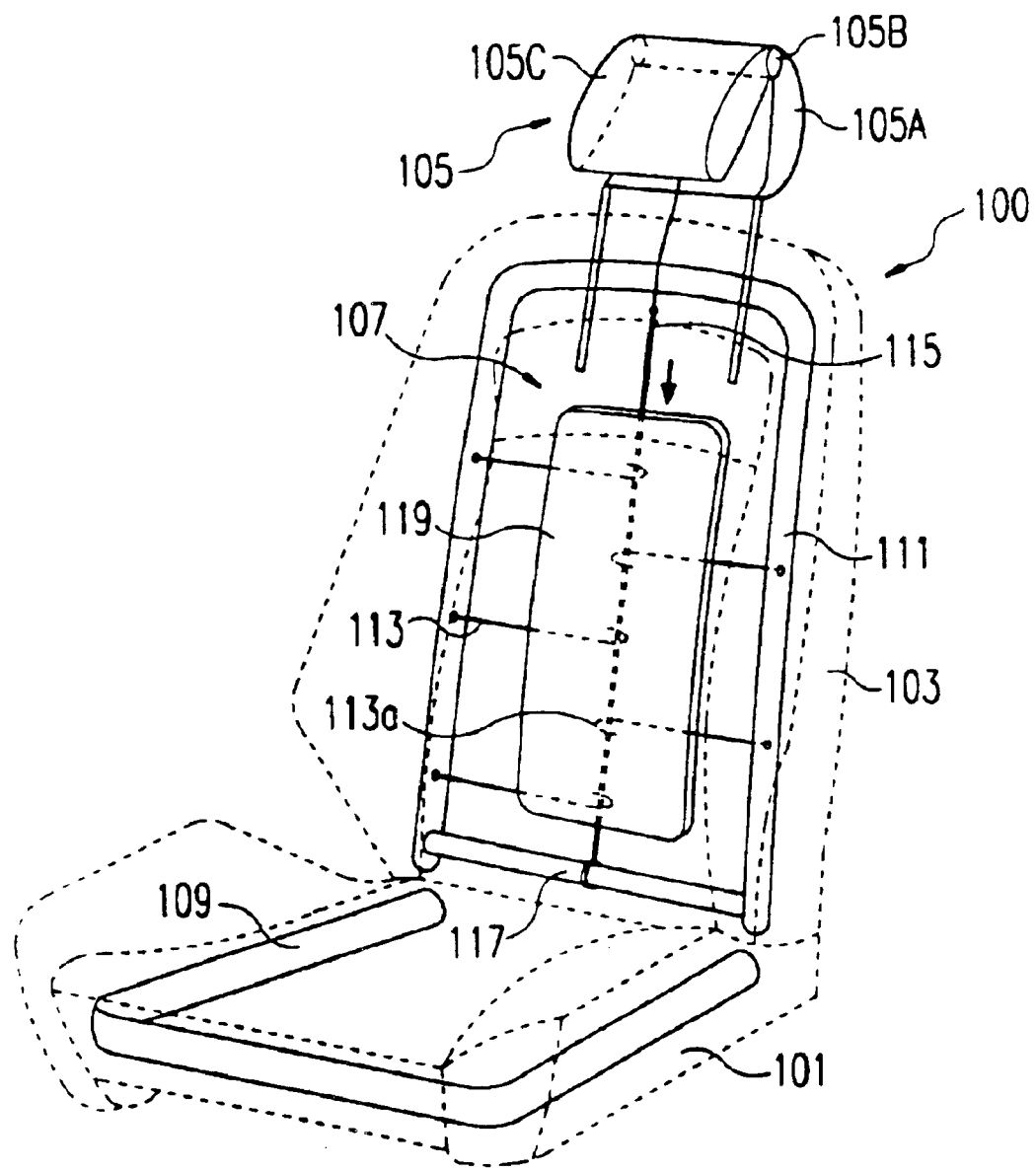
FIG. 2 shows a schematic, perspective illustration of a front seat of a passenger car in accordance with a first embodiment of the release in the event of a crash.

FIG. 2 shows, in a perspective illustration depicted by dashed lines, a front seat 100 of a passenger car having a seat part 101, a backrest 103 and a head restraint 105 in which a driving device 107 for an adjusting mechanism (not illustrated) is installed, which adjusting mechanism can be used to adjust the head restraint 105 in the event of a rear-end crash and optionally also a frontal crash. The seat part 101 and the backrest 103 have separate frame parts 109 and 111, respectively, made of metal sections.

The head restraint 105 has the construction described further above and of which the head restraint rear part 105A, the horizontal rotational axis 105B and the pivotable head restraint front part 105C can be seen in this Figure.

The driving device 107 comprises, for example, a total of five steel wires 113 which are fastened in each case by one end to one of the upright sections of the frame part 111 of the backrest 103 and at the other end have a hook 113a. The steel wires 113 run essentially horizontally and transversely with respect to the longitudinal axis of the vehicle and therefore with respect to the direction of movement of a vehicle occupant (not illustrated) in the event of a rear-end impact, and grip with their hooks 113a in an alternating manner from both sides around a Bowden cable 115 which runs essentially vertically.

The Bowden cable 115 is fastened by the one end to a lower transverse support 117 of the frame 111, and its upper end is connected—which is not illustrated in greater detail in the figure—to the head restraint front part 105C or to a lever/joint mechanism assigned thereto. The steel wires 113 and the Bowden cable 115 are each embedded over the greater part of their longitudinal extent in a movable manner in a load distributor plate 119 which, in particular, also covers the engagement points of the hooks 113a with the Bowden cable 115 from the abovementioned vehicle occupant's body.

If, in the event of a sufficiently severe rear-end impact or a "rebound" after a frontal impact, the vehicle occupant's body is pressed from the front against the backrest 103 by an acceleration which exceeds the absorption capacity of the upholstery (not illustrated), then it is pushed, in particular, also against the steel wires 113, and the latter pull the hook 113a towards them at the respective point at which the hook engages with the Bowden cable 115, since the steel wires are themselves inextensible.

As a consequence of the tension exerted by the steel wires 113 in an alternating manner from both sides, the flexible Bowden cable 115 takes on a zigzag or meandering form. Its (upper) free end is thereby pulled downwards in the direction of the arrow in the figure by an amount which substantially exceeds the amount of displacement of the vehicle occupant in the direction of the backrest and in the process releases a pivoting movement of the head restraint front part, which pivoting movement can be driven, for example, by means of a compression-spring device, which is released by means of the Bowden cable, between the head restraint rear part and head restraint front part.

Figure 3:
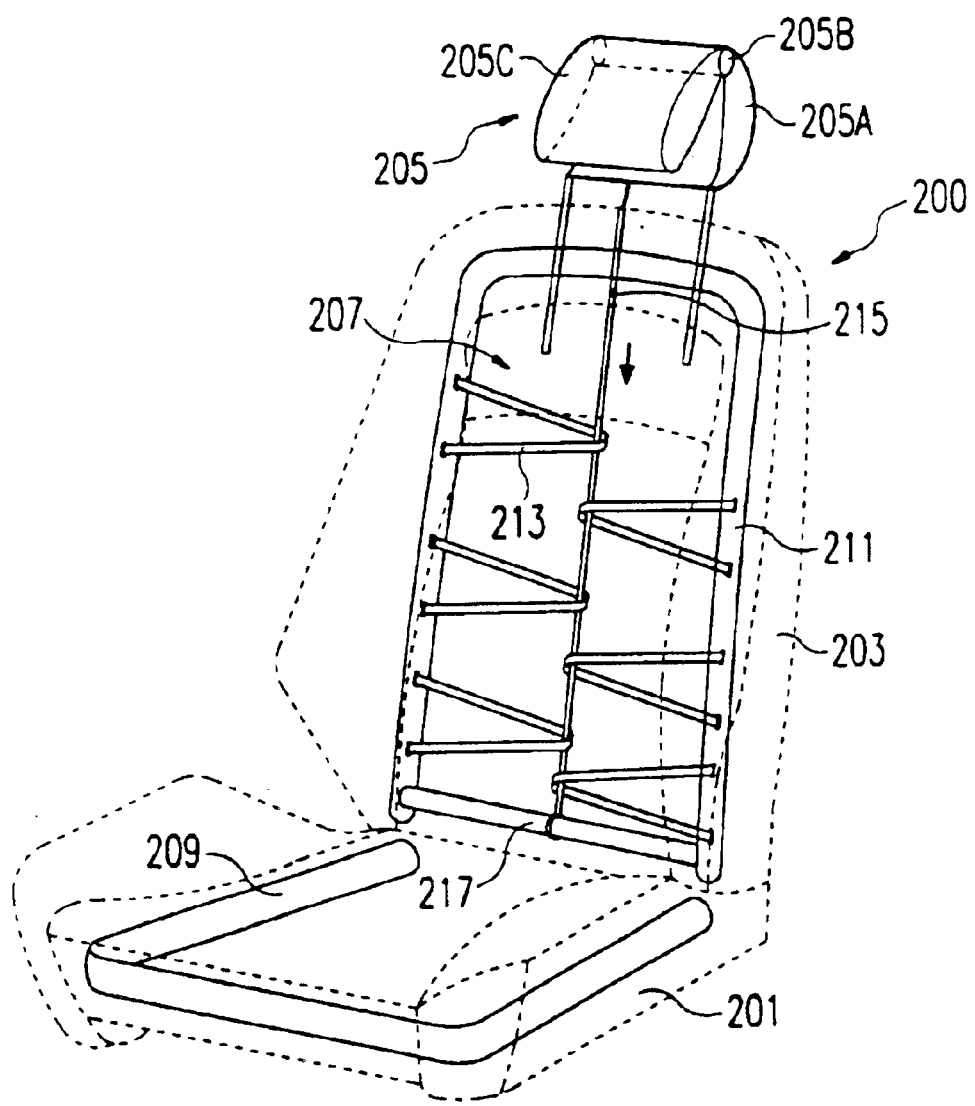
FIG. 3 shows a schematic, perspective illustration of a front seat of a passenger car in accordance with a second exemplary embodiment.

FIG. 3 sketches a further driving device 207 in a front seat 200 of a passenger car corresponding in respect of the rest of its construction to the seat according to FIG. 2. The driving device 207 here comprises a total of six fibre-reinforced, for example Kevlar reinforced plastic strips 213 which are looped in an alternating manner from both sides around a plastic cable 215, which is used as the secondary tension element and is likewise fibre-reinforced, and are in each case fastened by both ends in corresponding slots in the upright sections of the frame part 211.

The function of this arrangement basically corresponds entirely to that according to the first embodiment. The plastic strips 213 and the plastic cable 215 interact in a manner which is low in friction and in a similar way as the wires according to FIG. 2 interact with the Bowden cable provided therein as the secondary tension element. The design of the primary tension elements as nets or strips according to FIGS. 2 and 3, which design is flatter than steel wires, enables a separate load-distributing element to be omitted in the last-mentioned designs.

While the best mode for carrying out the invention has been described in detail, those familiar with the art to which this invention relates will recognize various alternative designs and embodiments for practicing the invention within the scope of the appended claims.

What is claimed is:

1. A vehicle seat for a passenger car, comprising:
   a backrest;
   a head restraint arranged on an upper end of the backrest, the head restraint including a rear part mounted to the backrest and a front part configured to contact a seat occupant and pivotable with respect to the rear part, the front part being pivotally connected to the rear part along a horizontal rotational axis;
   a spreading-lever device connected at a first end to the front part and connected at a second end to the rear part for pivoting the front part with respect to the rear part;
   at least one driving device that actuates the spreading-lever device in response to at least one control signal; and
   a cable that connects the at least one driving device to the spreading-lever device, wherein the cable is connected to the spreading-lever device at a linkage point.

2. The vehicle seat according to claim 1 wherein the at least one control signal is indicative of a vehicle impact.

3. The vehicle seat according to claim 1 wherein the at least one control signal is indicative of a desired inclination of the head restraint.

4. The vehicle seat according to claim 1 wherein the at least one control signal comprises a first control signal indicating a vehicle impact, the first control signal being operative to pivot the front part forward about a rotational axis by a large angular amount, and a second control signal indicating a desired inclination of the head restraint, the second control signal being operative to pivot the front part to a position selected by the seat occupant.

5. The vehicle seat according to claim 4 wherein the first control signal is provided by a mechanical actuator that detects an acceleration imparted during a vehicle impact to the vehicle occupant and converts the acceleration into a driving force for pivoting the front portion.

6. The vehicle seat according to claim 5 wherein the mechanical actuator has a compression plate arranged in the backrest that can be moved with respect to an essentially rigid frame of the backrest.

7. The vehicle seat according claim 5 wherein the backrest has a backrest frame, and the mechanical actuator has a plurality of primary tension elements fastened by at least one end to the backrest frame and a secondary tension element connected by at least one end to the backrest frame and at least one point to the front part, wherein the primary tension elements engage the secondary tension element in an alternating manner from opposite sides in such a manner that when the primary tension elements are acted upon by a displacement of the vehicle occupant, the secondary tension element is deformed in an essentially zigzag manner.

8. The vehicle seat according to claim 7 wherein the secondary tension element is a flexible wire.

9. The vehicle seat according to claim 7 wherein the primary tension elements loop around the secondary tension element and are fastened at each end to the backrest frame.

10. The vehicle seat according to claim 7, wherein the primary tension elements are fastened in an alternating manner to opposite sides of the backrest frame, and the secondary tension element is fastened to a transverse support of the backrest frame.

11. The vehicle seat according to claim 7 wherein the primary tension elements and the secondary tension element are arranged behind a backrest upholstery of the vehicle seat.

12. The vehicle seat according to claim 7 wherein the primary tension elements and the secondary tension element are disposed in a load distributor plate.

13. The vehicle seat according to claim 1, wherein the at least one driving device comprises an electric motor.

14. The vehicle seat according to claim 13, wherein the electric motor pivots the front part forward in the event of a vehicle impact.

15. The vehicle seat according to claim 1 further comprising a spring element that biases the front part of the spreading-lever device to spread away from the rear part.

16. The vehicle seat according to claim 1 wherein the spreading-lever device is configured to be moved to a locked position during a vehicle impact.

17. The vehicle seat according to claim 1 wherein the cable is connected to a first driving element for adjusting inclination of the front part, and a second driving element for pivoting the head restraint forward during a vehicle impact.

18. The vehicle seat of claim 1 wherein the spreading-lever device comprises a first lever and a second lever pivotably connected at a linkage point.

* * * * *